Oct. 23, 1928.

H. B. SWARTZ 1,689,087

VOTING MACHINE COUNTER READER

Filed April 11, 1928

Inventor:
Hiram B. Swartz

Patented Oct. 23, 1928.

1,689,087

UNITED STATES PATENT OFFICE.

HIRAM B. SWARTZ, OF WOOSTER, OHIO.

VOTING-MACHINE COUNTER READER.

Application filed April 11, 1928. Serial No. 269,044.

This invention relates to improvements in voting machines, and particularly to the type shown in Letters Patent issued to me, No. 935,869, in which slidable voting keys, arranged in vertical columns and horizontal rows, cooperate with companion counters arranged in like manner on the opposite side of the machine face; and its principal object is to provide improved means for reading off the vote registered on the several counters, and for identifying the latter with their companion voting keys, whereby the indicia upon the counters may be quickly and easily seen and made known when the polls close, and the votes cast for the different candidates ascertained immediately and without danger of errors by mis-reading them, and to reduce the expense of printing ballot labels and counters, as heretofore required.

Figure 1:
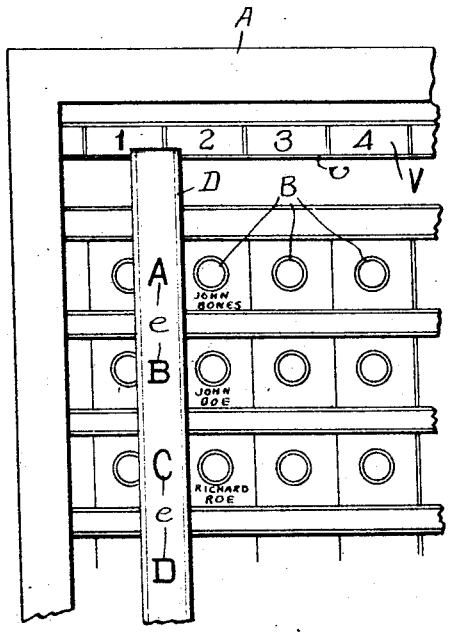
Figure 2:
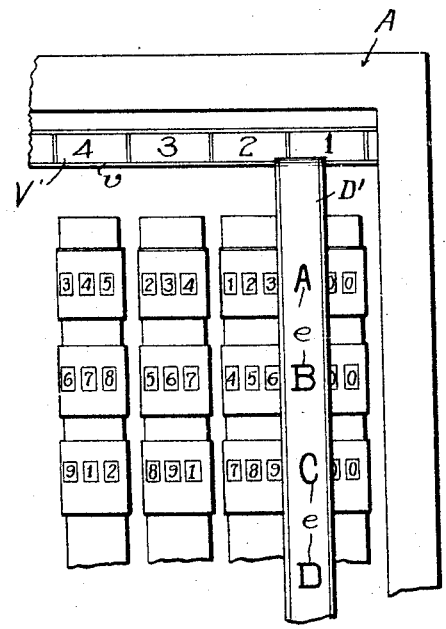
Figure 3:
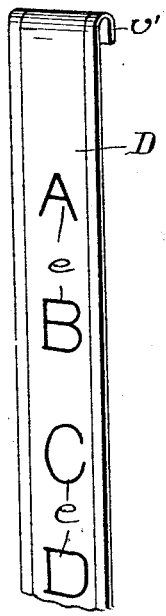

My invention is illustrated by the accompanying drawings in which similar letters and figures of reference indicate like parts. Referring thereto, Fig. 1 is a front elevation showing a portion of the machine face A, and a plurality of vertical columns and horizontal rows of voting keys B; and Fig. 2 is a rear elevation showing corresponding columns and rows of companion counters for the voting keys. Fig. 3 is a perspective view of my adjustable reading strip—so called, for identifying the counters with their several companion voting keys, detached.

The means for speedy and exact counting of the number of votes cast at an election comprise the use of a pair of reading-strips D, D',—so called—in combination with each other, one on the ballot side of the machine, and the other on the counter side thereof.

The reading strips are, in all respects, substantially alike, and have identical insignia $e$, $e$, arranged thereon, spaced apart equi-distant to correspond with the spaces between the voting keys and counters in the vertical columns—the strip on one side being in alignment with and adjacent to the vertical column of voting keys, and the strip on the opposite side in alignment with and adjacent to the vertical column of companion counters. The identical insignia on each reading strip being thus located exactly opposite each other, as shown in Figs. 1 and 2 are thereby mutually identified. To locate and support said pair of reading strips, I employ a pair of number strips—so called—V, V', the one secured horizontally above the several columns of voting keys, and the other secured horizontally above the several columns of counters, like indicia (preferably numerals) being marked thereon and spaced apart so as to correspond with the spaces between the columns, each number being aligned with an adjacent column, and with a companion column on the opposite side, the numbers on one strip being in reverse order from the other, so as to read alike on opposite sides of the machine. The number strips are each provided with a projecting flange or turned out edge $v$, adapted to slidingly engage a catch $v'$, at the upper end of the reading strip, as shown in Fig. 3.

By such arangement, when the name of any candidate is called, and the number above the column and letter on the reading strip opposite the name is given, the companion counter may be immediately identified, and the vote therefor announced. The reading strip may be manually shifted from one column to another.

The insignia on the strips may be of any desired character, provided the identity necessary is preserved, and the means for removably engaging the reading strips may be varied, without departing from my invention.

I am aware that label strips have been heretofore used on typewriters and the like for reading lines and items, and such I do not broadly claim. My invention is distinguished by a new cooperation of a pair of reading strips removably and slidingly suspended vertically from a related pair of label strips, the latter having identical insignia spaced apart thereon, and horizontally secured on opposite sides of a voting machine, the insignia on one label strip being arranged thereon in reverse order from the insignia on the other so as to read identically from opposite sides of the machine, and each label strip adapted to support one of said pair of reading strips opposite the other, said strips having identical insignia spaced apart thereon, opposite each other.

What I claim is—

1. In a voting machine, the combination with a plurality of voting keys arranged in parallel party rows and vertical office columns on one side of the machine, and counters set opposite said voting keys, respectively on the opposite side thereof, of means for identifying the several counters with their companion voting keys, respectively, to ascertain the votes indicated thereon, comprising a pair of number strips, each having identical indicia spaced apart thereon, the indicia on both being identical, but arranged in reverse order on one from the other—one strip secured in alignment with the horizontal rows of voting keys, and the other, with the horizontal rows of counters, and so that like indicia on both are directly opposite each other, and a pair of lettered strips, having identical indicia spaced apart thereon like the counters in vertical columns, and means for removably and slidingly suspending said lettered strips vertically opposite each other upon said number strips, respectively, at identical insignia thereon, substantially as set forth.

2. In a voting machine, the combination with a plurality of voting keys arranged in horizontal rows and vertical columns on one side of the machine, and companion counters for said keys aligned therewith on the opposite side thereof, of a pair of label strips having identical insignia spaced apart thereon—the insignia on one strip being arranged in reverse order from the insignia on the other, so that opposite insignia read alike from end to end on both strips—said strips secured horizontally opposite each other on opposite sides of the machine, each strip having a turned out edge along one side thereof, and a pair of reading strips having identical insignia spaced apart thereon, each strip having a catch at one end adapted to removably engage said turned out edge of its adjacent label strip to thereby vertically suspend each reading strip with its insignia directly opposite identical insignia on the other reading strip.

In witness whereof I hereunto set my hand this 17th day of February, A. D. 1928.

HIRAM B. SWARTZ.